United States Patent [19]
Patz et al.

[11] Patent Number: 5,333,380
[45] Date of Patent: Aug. 2, 1994

[54] METHOD OF SHAFT MOUNTING A SINGLE TAPERED BUSHING

[75] Inventors: Byron M. Patz, Naperville; Glenn R. Schwartz, DesPlaines, both of Ill.

[73] Assignee: Regal-Beloit Corporation, Beloit, Wis.

[21] Appl. No.: 60,393

[22] Filed: May 11, 1993

Related U.S. Application Data

[62] Division of Ser. No. 495,422, Mar. 19, 1990, Pat. No. 5,211,488.

[51] Int. Cl.$^5$ .............................................. B23P 15/00
[52] U.S. Cl. .................... 29/898.07; 29/428; 384/584
[58] Field of Search ............... 384/584, 538, 271, 272; 403/370; 29/898.07, 428

[56] References Cited

U.S. PATENT DOCUMENTS

| | | | |
|---|---|---|---|
| 929,851 | 8/1909 | Hess | 384/538 |
| 1,583,562 | 5/1926 | Stenner | 384/538 |
| 4,626,114 | 12/1986 | Phillips | 384/584 |

*Primary Examiner*—Irene Cuda
*Attorney, Agent, or Firm*—Patnaude, Videbeck & Marsh

[57] ABSTRACT

A shaft-mounted bushing for connecting a rotating member to a shaft. The bushing includes a frame receiving a hub rotatably mounted therein. The hub includes an opening at one end thereof for receiving a shaft from the one end thereof. The hub includes a tapered portion which converges inwardly from the one end of the hub and toward the other end thereof. A sleeve is mounted into the hub from the one end of the hub and between the tapered portion of the hub and the cylindrical shaft. The outer portion of the sleeve converges inwardly from the one end of the hub and engages the hub. The sleeve presents an inward portion which is coaxial with and parallel to the cylindrical shaft for engaging the shaft in force transmitting relation ship therewith. The bushing assembly is completed by drawing the sleeve into the hub by way of a fastener located at the other end of the hub.

4 Claims, 2 Drawing Sheets

METHOD OF SHAFT MOUNTING A SINGLE TAPERED BUSHING

This is a divisional of copending application Ser. No. 07/495,422 filed on Mar. 19, 1990, now U.S. Pat. No. 5,211,488.

BACKGROUND OF THE INVENTION

This invention relates to a single tapered bushing for receiving and mounting a shaft within a rotatable hub so as to permit the shaft to be readily rotatably coupled to the hub and so as to accommodate variations in both concentricity variations and misalignments of the shaft axis and the hub axis. More particularly, the present invention relates to a single tapered bushing wherein the tapered portion of the cooperating sleeve projects outwardly from the end of the bushing opposite to the end in which the shaft is received and is thereby utilized to complete the assembly.

Single tapered bushing systems for mounting a shaft to a utility device, such as, for example, a speed reducer, are known and have been widely used in the art. Such devices are exemplified in U.S. Pat. Nos.: 4,626,114 and 2,811,861. In these known devices, the shaft is inserted from a first end of the bushing device in which a sleeve is provided between the shaft and a rotatable hub of the bushing system. These systems have the disadvantage that the shaft is not easily assembled to the bushing system and cannot be readily removed. This is because the shaft must be assembled with the bushing system between the end of the frame of the bushing system and the immediately adjacent associated machinery. This is a problem because typically there is insufficient clearance to provide access to the fasteners which assemble the bushing unit to the shaft as those fasteners are located on the side of the bushing system which is immediately adjacent to the associated machinery. These and other disadvantages are overcome by the present invention, wherein the shaft is inserted in the conventional manner from a first end of the bushing device. However, the bushing device includes a hub member and cooperating tapered sleeve member of the bushing system which are assembled in a manner which is directly opposite to that utilized in the prior art and wherein the assembly is completed at the end of the bushing system which is remote from the end in which the shaft is inserted into the bushing assembly.

SUMMARY OF THE INVENTION

Briefly, a shaft mount bushing for connecting a rotating member to a shaft having an axis is provided. The bushing comprises a frame. A hub is rotatably mounted to the frame and includes an opening at one end thereof for receiving the shaft generally coaxially therein. The hub includes a radially inward surface which tapers inwardly toward the other end of the hub. A sleeve is mounted in the hub between the inward surface of the hub and the shaft. The sleeve includes a radially outward surface which tapers inwardly toward the other end of the hub. Means are provided at the other end of the hub for drawing the sleeve into the hub. Finally, means are provided for imparting rotary motion to the hub.

BRIEF DESCRIPTION OF THE DRAWING

The advantages of this invention will become more readily appreciated as the same becomes completely understood by reference to the following detailed description when taken in conjunction with the accompany drawing wherein:

FIG. 3 is an end view of the sleeve illustrated in full view in FIG. 4a;

DETAILED DESCRIPTION

Figure 1:
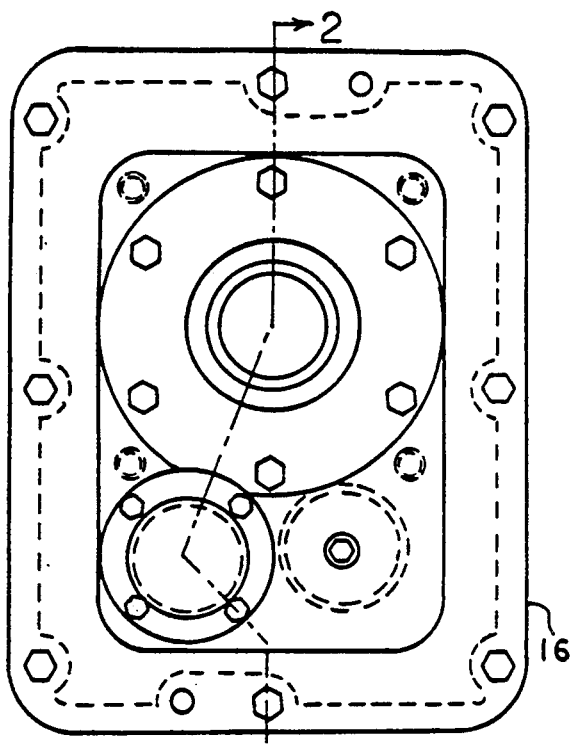
FIG. 1 is a side elevational view of one side of a shaft-mounted speed reducer incorporating a single tapered bushing shaft mount in accordance with the principles of the present invention.
Figure 2:
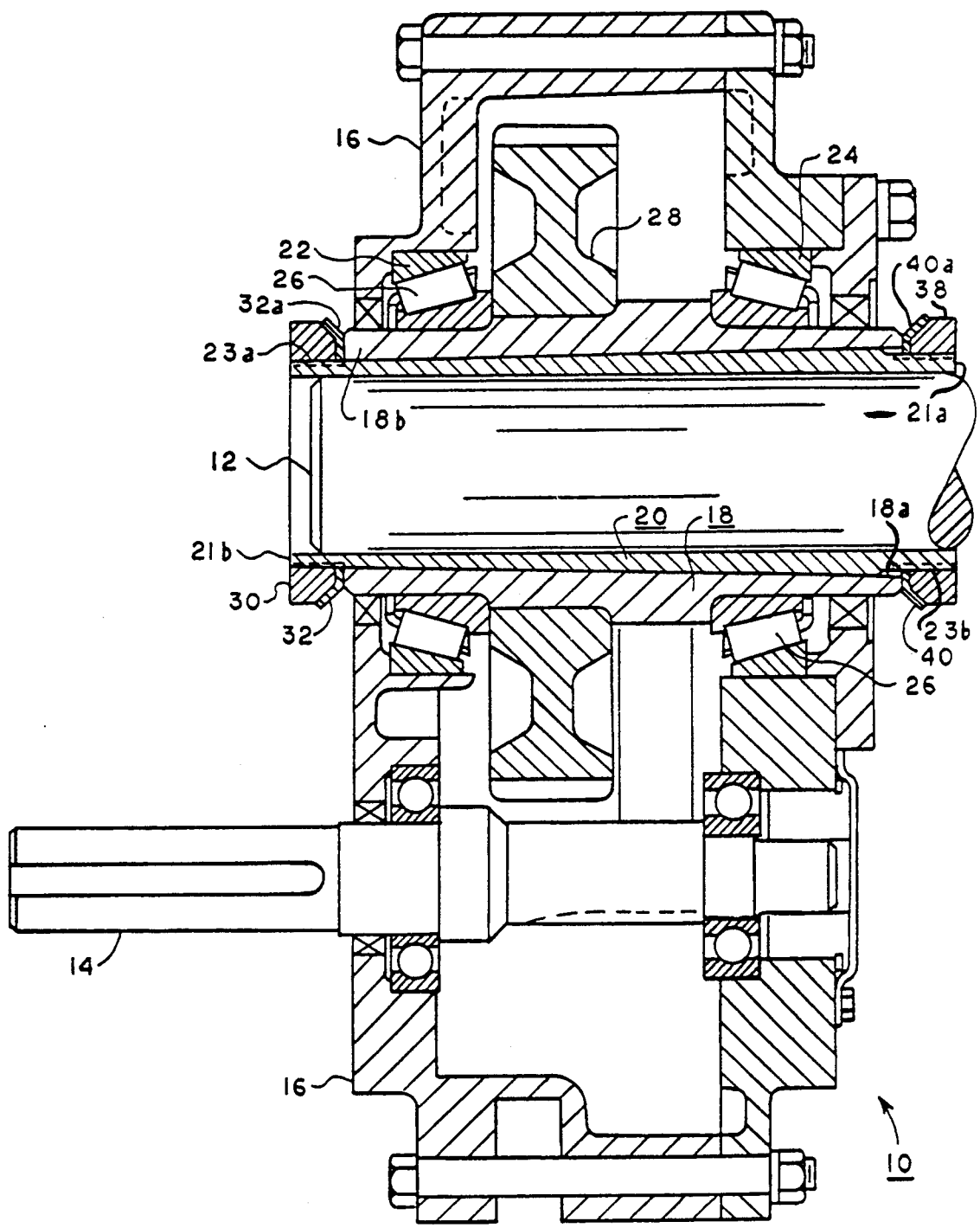
FIG. 2 is a longitudinal cross-section view of a speed reducer of FIG. 1, taken along the line 2—2 of FIG. 1.

Referring now to FIG. 1 there is shown a side elevation view of the front side of a shaft mounted production speed reducer, shown generally at 10, incorporating a single tapered bushing shaft mount of the present invention. As best illustrated in FIG. 2, which is a longitudinal cross-sectional view of the speed reducer of FIG. 1 taken along the line 2—2 of FIG. 1, the speed reducer 10 accepts a low speed shaft, commonly known as a so-called "customer's shaft" or driven shaft 12 and a high speed input shaft 14. By way of further background, a typical speed reducer has an input or high speed pinion shaft driven at a relatively high rotational speed by an electric motor or other prime mover. The speed reducer includes a housing which journals the input shaft and which houses and journals a speed-reducing gear train assembly therein. The housing further typically includes an output quill which includes a hub, with the quill hub being journalled with respect to the speed reducing housing and being driven at a relatively reduced speed by the gear train with a corresponding increase in output torque.

Figure 4B:
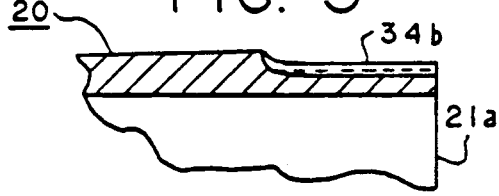
FIG. 4b is a partial view of one end portion of sleeve of FIG. 4a illustrating in somewhat greater detail lockwasher retaining system employed therein.
Figure 4A:
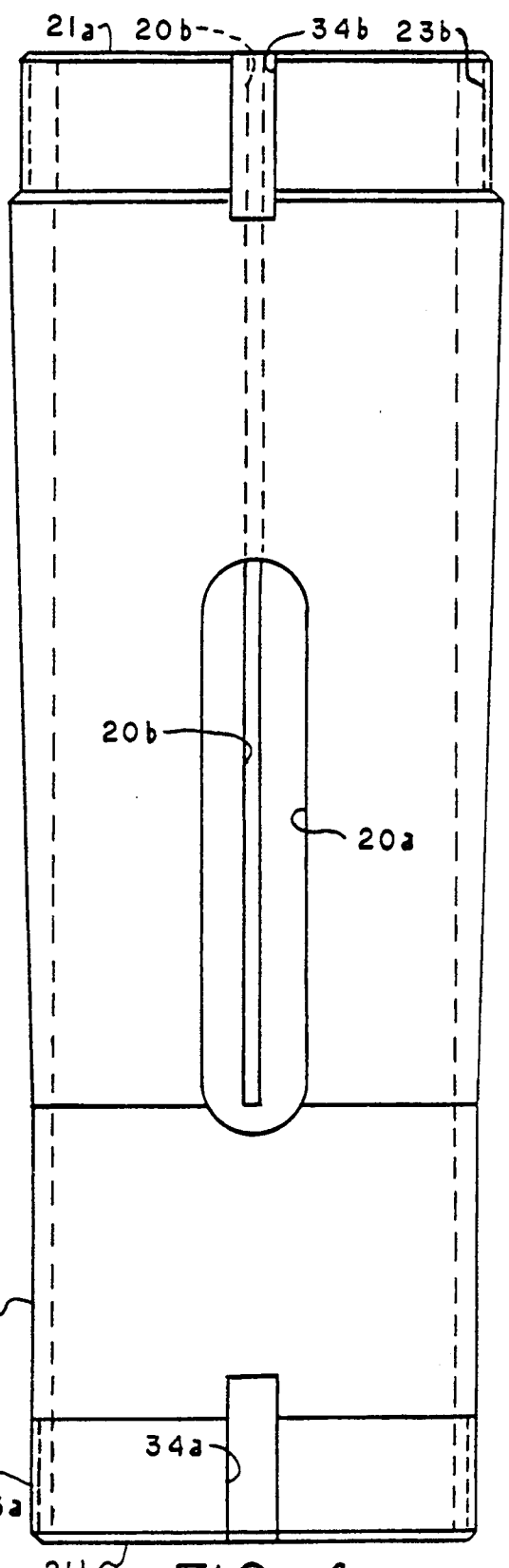
FIG. 4a is a plan view of the sleeve of the bushing device in accordance with the principles of the present invention.

Referring again more specifically to FIG. 2, it can be seen that the shaft mounted speed reducer 10 includes a housing 16 in which the high speed shaft 14 and the low speed or driven shaft 12 are provided therein. As will be explained more fully hereinafter, the low speed shaft 12 is positively coupled to a freely rotating quill hub or hub 18 by way of a sleeve 20, both of which elements are concentrically and coaxially disposed about shaft 12. Hub 18 is supported within housing 16 by means of a pair of spaced anti-friction bearings 22 and 24. Each bearing has an outer race fixed with respect to the housing and an inner race rotatably mounted with respect to the outer race. A plurality of roller elements 26 are disposed between the inner and outer races of bearings 22 and 24 which form an anti-friction bearing commonly referred to as a roller bearing as is well known in the art. Fixedly mounted to hub 18 is a first gear 28 the gear teeth of which engage a second gear (not shown) which is fixedly connected to the high speed shaft 14 to provide the desired speed reduction between shaft 14 and shaft 12, again as is well known in the art. Shaft 12 is positively connected to hub 18, by way of sleeve 20 and is fixed thereto by way of a key which is received within a slot 20a of sleeve 20 as best illustrated in FIG. 4a. The further details of housing 16, such as the journal bearings surrounding high speed shaft 14, are well known and have been widely used in the art and accordingly need not be described in greater detail herein. As will be described more fully hereinafter, what is important with respect to the present invention, is the configuration of hub 18, sleeve 20 and the manner in which those members are positively connected to low speed shaft 12.

Figure 3:
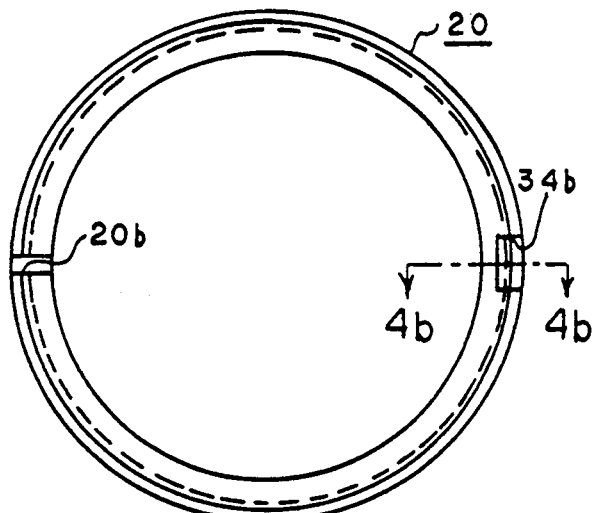

Referring again to FIG. 2, it can be seen that hub 18 is tapered radially inwardly with respect to the axis of shaft 12 from a first end 18a of hub 18 and toward the other end 18b of hub 18 in which the shaft 12 is received. Further, sleeve 20 is similarly tapered in the direction from the first end 18a of hub 18 radially inwardly toward the other end 18b of hub 18. Once shaft 12 is inserted into speed reducer 10, a threaded fastener 30, preferably provided in the form of a locknut, threadedly engages a threaded end portion 23a of sleeve 20. A lockwasher 32 is provided between locknut 30 and the end 18b of hub 18. Lockwasher 32 includes a radially outwardly directed tab 32a which is folded over and received within a corresponding slot of locknut 30 after locknut 30 is advanced onto sleeve 20 to provide the positive connection between sleeve 20 and rotating hub 18. Locknut 32 also includes a radially inwardly directed tab (not shown) which engages an undercut groove 34a as best illustrated in FIG. 4a and having a configuration similar to groove 34b of FIG. 4b. As best illustrated in FIGS. 3 and 4a, sleeve 20 includes a longitudinal slot 20b which extends approximately ⅔ the length of sleeve 20 from its first end 21a toward the other end 21b thereof.

The first end 21a of sleeve 20 also is threaded at 23b to receive a second threaded fastener or locknut 38 which similarly threadedly engages the threaded first end portion 21a of sleeve 20. A second lockwasher 40 is provided with a radially outwardly extending tab 40a and an inwardly directed tab (not shown) for respectively engaging slots in locknut 38 and a second undercut slot 34b in sleeve 20.

In operation, the speed reducer is assembled by advancing housing 16 over or advancing shaft 12 through housing 16 into the relative positions depicted in FIG. 2. Thereafter, locknut 30 is torqued onto threaded end 20a of sleeve 20 to draw the assembly tightly onto the shaft 12. Since it is also desireable, if not essential that shaft 12 be readily capable of being both coupled to and, even more importantly, easily removed from the speed reducer, in accordance with the teachings of the present invention, means are provided to achieve these objects. As previously mentioned, shaft 12 is coupled to the speed reducer 10 by means of tightening or advancing locknut 30 onto sleeve 20 and is secured thereto by means of locknut 30 and the inwardly and radially outwardly directed tabs thereof. It will now be appreciated by those skilled in the art that speed reducer 10 is positively connected to shaft 12 without requiring access to the end of housing 16 which faces the extending portion of shaft 12 and the machinery associated therewith. Moreover, the positive coupling of shaft 12 with speed reducer 10 is accomplished from the opposite or free side of housing 16.

When it becomes necessary to remove shaft 12 from speed reducer 10 or to remove speed reducer 10 from shaft 12, locknut 38 can be utilized to tighten or advance it further onto sleeve 20 so as to disengage sleeve 20 from hub 18 to free speed reducer 10 from the low speed shaft. Further, it has been found that, when necessary, the removal of sleeve 20 from hub 18 can be further facilitated by removing locknut 30 and applying a suitable force to the exposed end 21b of sleeve 20 such as by way of a sledge hammer. As will be appreciated by those skilled in the art, these measures are often needed particularly when fretting corrosion has occurred between the mating surfaces of shaft 12, hub 18 and sleeve 20. It will also be appreciated by those skilled in the art that the configuration of the present invention facilitates, particularly, removal of the speed reducer or separation of the speed reducer from the shaft. This is accomplished in that a complex nut and bolt or fastener arrangement is not required at the right hand or low speed shaft receiving portion of the assembly in order to draw the sleeve into the hub and onto the shaft as is characteristic of the prior art. That is, in the prior art, a nut and bolt arrangement normally is deployed between the speed reducer housing and a flange end of the sleeve which faces the user's equipment. Accordingly, insufficient room is provided to gain access to those fastener members located in the interface between the user's equipment and of the bushing assembly. On the other hand, in the present invention, locknut 40 is readily accessible, such as by way of a common spanner wrench, to provide the necessary torquing to separate sleeve 20 from hub 18 and thereby free shaft 12 from speed reducer 10.

What has been taught, then, is a bushing assembly for a shaft mount facilitating, notably, installation on and removal of the bushing assembly from the shaft, and which overcomes the disadvantages of the prior art. The form of the invention illustrated and described herein is but a preferred embodiment of these teachings. It is shown as an illustration of the inventive concepts, however, rather than by way of limitation, and it is pointed out that various modifications and alterations may be indulged in within the scope of the appended claims.

What is claimed is:

1. A method for shaft-mounting a bushing for connecting a rotating member to a driven shaft having an axis, said method comprising, the steps of:

providing a frame;

rotatably mounted in a hub to said frame, said hub having an opening at one end thereof for receiving said driven shaft generally coaxially therein, said hub having a radially inwardly facing surface which tapers inwardly toward the other end of said hub;

mounting a sleeve in said hub between said inwardly facing surface and said haft with said sleeve being received within said hub from said one end of said hub, said sleeve having a radially outwardly facing surface which tapers inwardly toward said other end of said hub;

drawing said sleeve into said hub from said other end of said hub; and, connecting said rotatable hub to an external device remote from said frame.

2. The method according to claim 1, wherein said hub tapers radially inwardly toward said other end of said hub.

3. The method according to claim 1, wherein said sleeve engages said driven shaft.

4. The method according to claim 1, wherein said sleeve is removable from said bushing from said one end of said hub.

* * * * *